United States Patent [19]

Evans et al.

[11] 4,140,291
[45] Feb. 20, 1979

[54] RAMP TOE STOWAGE SYSTEM

[75] Inventors: Donald E. Evans, Marina del Rey; Lewell M. Lively, Jr., Anaheim, both of Calif.

[73] Assignee: The United States of America as represented by the Secretary of the Air Force, Washington, D.C.

[21] Appl. No.: 841,776

[22] Filed: Oct. 13, 1977

[51] Int. Cl.² .............................................. B64C 1/14
[52] U.S. Cl. ............................... 244/118 R; 244/129.5
[58] Field of Search ............ 244/118 R, 118 P, 137 R, 244/137 P, 129.5, 129.6, 129.4; 24/257 R; 14/71.1, 71.5, 72.5; 49/37, 40, 79; 105/367, 368 R, 378

[56] References Cited

U.S. PATENT DOCUMENTS

| | | | |
|---|---|---|---|
| 1,906,874 | 5/1933 | Platt | 24/257 R |
| 4,032,092 | 6/1977 | Day | 244/137 R |

*Primary Examiner*—Galen L. Barefoot
*Attorney, Agent, or Firm*—Joseph E. Rusz; Arsen Tashjian

[57] ABSTRACT

A structural system for capturing, supporting, and releasably securing a tail ramp toe of an aircraft, while the aircraft is either on the ground or in flight. The preferred embodiment of the ramp toe stowage system is adapted for use with a cargo aircraft having: a downwardly and outwardly opening tail ramp, with at least one ramp toe removably attached to it; and, an upwardly and inwardly opening tail door that is complementary to, and aft of, the tail ramp, with the tail door having an internal surface. The stowage system is located over, and is attached to, the internal surface of the tail door, and includes two horizontally positioned tracks that accept complementary guide rollers which are on the side edges of the ramp toe, near the known center of gravity of the toe. Unlike the prior art, the system requires only one man to stow the ramp toe, or to release it from stowage, even while the aircraft is in flight.

7 Claims, 14 Drawing Figures

RAMP TOE STOWAGE SYSTEM

STATEMENT OF GOVERNMENT INTEREST

The invention described herein may be manufactured and used by or for the Government for governmental purposes without the payment of any royalty thereon.

CROSS REFERENCE TO RELATED APPLICATION

The inventive system taught herein is related in general subject matter of U.S. Pat. application Ser. No. 643,506, entitled "Ramp With Integral Toes," in that the torque tube (and associated components and like) described therein, for removably attaching, rotating (i.e., raising, lowering, and the like), and removing a tail ramp toe can be utilized in combination with out inventive ramp toe stowage system.

BACKGROUND OF THE INVENTION

This invention relates to a unique stowage system for a tail ramp toe of a cargo aircraft and, more particularly, to such a system adapted for use in, and with, a cargo aircraft of the "short takeoff and landing" type (hereinafter referred to as the "STOL" type).

Cargo aircraft, particularly those of the STOL type, need and have auxiliary tail ramp toes or the like which bridge the height from the aft end edge of the tail ramp to the ground during ground loading, or ground off-loading, of the cargo. More specifically, the YC-15 Advance Medium STOL cargo aircraft has two such auxiliary tail ramp toes; and, the toes are removably attached to the tail ramp with an actuatable torque tube, and other associated components, such as are disclosed in the above-identified U.S. Pat. No. Application (i.e., "Ramp With Integral Toes," Ser. No. 643,506, now U.S. Pat. No. 4,032,092). That torque tube permits the tail ramp toes to be lowered to the ground during loading of cargo. After loading and to prepare for flight, the tail ramp is raised, by and with the use of the torque tube, and the tail ramp toes are automatically rotated up and forward, until their upper surface is approximately at 90 degrees with the internal surface of the tail ramp.

It is here to be noted that cargo aircraft usually have (and the Y-15 STOL cargo aircraft does have) a downwardly and outwardly opening tail ramp, and a complementary upwardly and inwardly opening tail door aft of the tail ramp. Accordingly, the tail ramp is closed by being raised inwardly, and the tail door is closed by being lowered outwardly.

Therefore, with the tail ramp and the toes of the YC-15 cargo aircraft in the above-stated position, the tail door (also sometimes referred to in the art as the "cargo door") is closed by being lowered (i.e., rotated downwardly). Additionally, in the YC-15 cargo aircraft, for aerial delivery), the tail ramp toes are removed manually from the tail ramp, and are stowed on the upper structure of the tail door (i.e., the "cargo door"). The tail door is then raised upwardly and inwardly, and the cargo is delivered (i.e., dropped) off the aft end edge of the trail ramp.

We have invented a ramp toe stowage system that is simple in structure, is light in weight, is safe (i.e., positively restrains the stowed toe(s) at all times), and requires only one man to stow (or to remove from stowage) the toe(s) while the cargo aircraft is in flight, despite the fact that each toe weighs approximately 160 pounds. The system is well suited for all cargo aircraft of the type described, and is ideal for use in and with the YC-15 cargo aircraft.

The invention fulfills a current need in the art; and, therefore, it significantly advances the state-of-the-art.

SUMMARY OF THE INVENTION

This invention provides a novel tail ramp toe stowage system, as adapted for use with a cargo aircraft having a downwardly and outwardly opening tail ramp and an upwardly and inwardly opening tail door complementary to and aft of the tail ramp, wherein the tail ramp and the tail door can be opened while the aircraft is on the ground and also while the aircraft is in flight (i.e., airborne), and wherein the tail ramp has at least one ramp toe removably attached to it.

Accordingly, the principal object of this invention is to teach the structure of such a unique tail ramp toe stowage system.

This principal object, as well as related objects, of this invention will become readily apparent after a consideration of the description of the invention, together with reference to the Figures of the drawings.

DESCRIPTION OF THE PREFERRED EMBODIMENT

Figure 1:
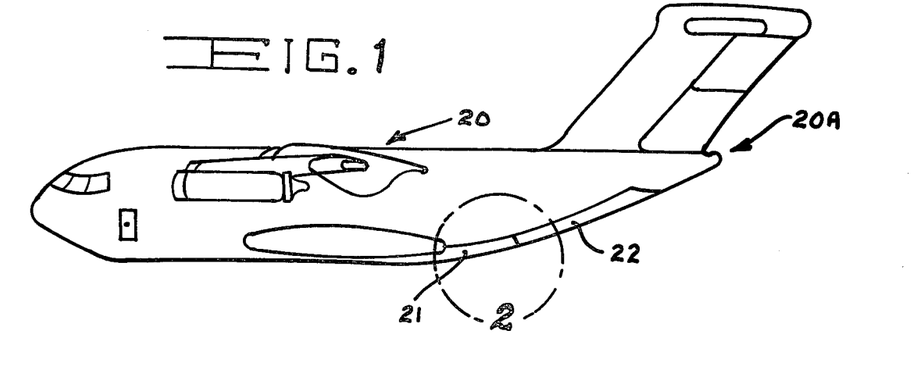
FIG. 1 is a side elevation view, in simplified pictorial form, of a cargo aircraft while airborne, wherein the aircraft has a downwardly and outwardly opening tail ramp, and an upwardly and inwardly opening tail door that is complementary to, and aft of, the tail ramp.

With reference to FIG. 1, therein is shown an airborne cargo aircraft 20. As a matter of preference, and not of limitation, the aircraft 20 is a YC-15 Advance Medium STOL cargo aircraft. The aircraft 20 has a tail section (generally designated 20a) which includes a downwardly opening tail ramp 21, and an upwardly and inwardly opening tail door 22 that is complementary to, and is aft of, the tail ramp 21.

Figure 2:
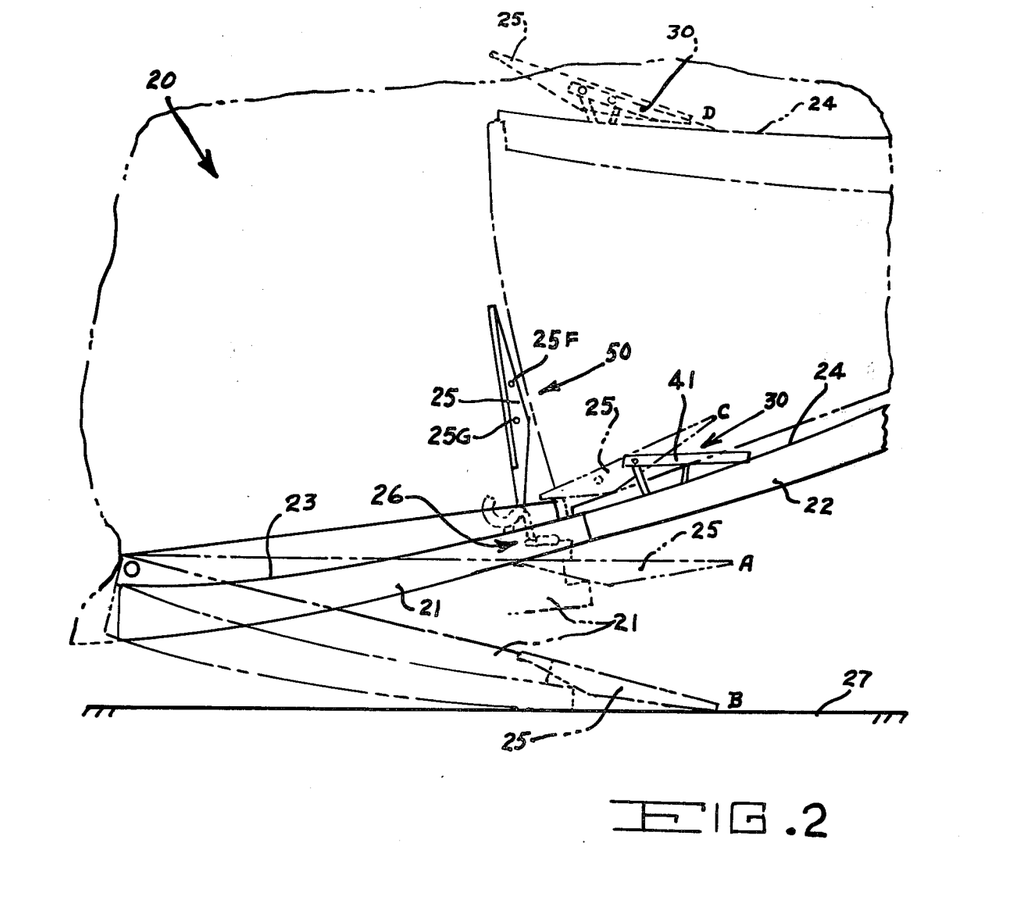
FIG. 2 is a side elevation view, in simplified form, and enlarged partially pictorial, partially schematic, and partially fragmented, of that portion of FIG. 1 which is enclosed within circular line 2, showing the tail ramp tow in various positions, including while stowed.

In FIG. 2 is shown, enlarged and in greater detail, that which is enclosed in circular line 2. More specifically, shown are: aircraft 20; tail ramp 21 with internal surface 23; complementary tail door 22 with internal surface 24; tail ramp toe 25 removably attached to tail ramp 23, with the toe being in the approximately 90 degree position previously discussed herein; and, the torque tube and associated components (generally designated together as 26) for removably attaching rotating, and removing tail ramp toe 25. Also shown is a preferred embodiment of our inventive ramp toe stowage system 30. Further shown, in phantom, are: an intermediate toward-the-ground downward and outward opening of the tail ramp 21 with ramp toe 25 extended (position A); a final on-the-ground position of tail ramp 21 with ramp toe 25 extended (position B) and on the ground 27; the tail ramp toe 25 detached from tail ramp 21 and in an intermediate position being stowed on and in our preferred embodiment 30 (position C); and the tail ramp toe 25 stored, and releasably secured, on and in our invention 30 (position D).

Figure 3:
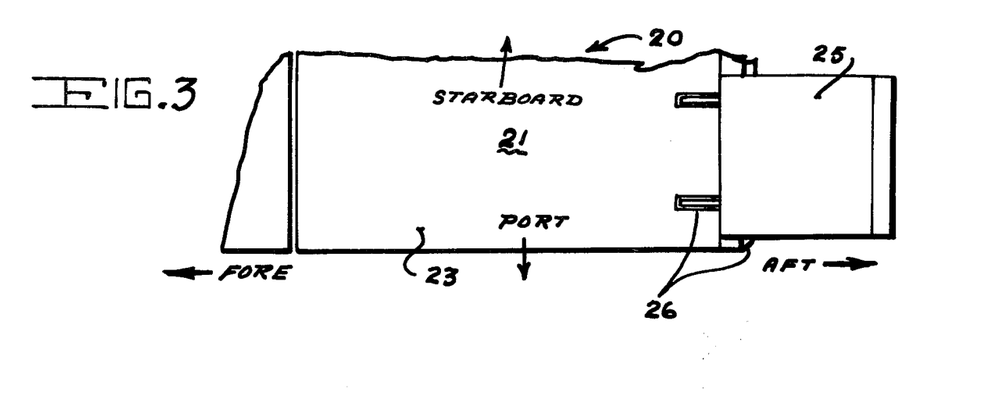
FIG. 3 is a top lan view, in simplified schematic form, of the tail ramp of the aircraft shown in FIG. 1, and of a tail ramp toe removably attached to the tail ramp.

With reference to FIG. 3, therein is shown, in top plan view and partially fragmented, the tail ramp 21 with internal surface 23, and the ramp toe 25 removably attached by means 26 to the ramp 21. Also shown, by way of better orienting the reader, the directional designations "Fore," "Aft," "Port" and "Starboard," together with appropriate arrows. In this regard it is to be noted that the directional designations are with reference to the aircraft 20 itself, as is conventional.

Figure 4:
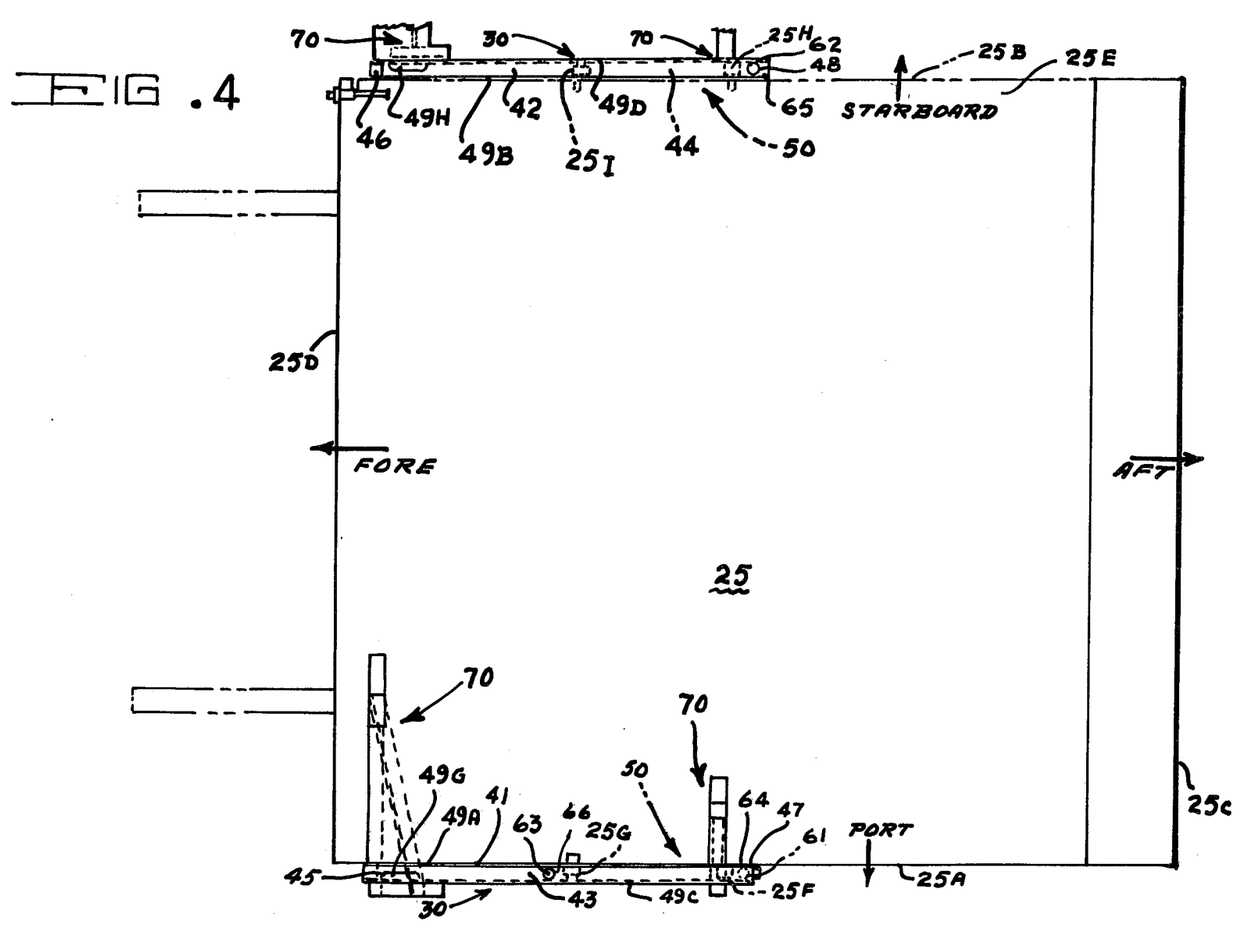
FIG. 4 is a top plan view, in simplified schematic form, of the tail ramp toe, shown in FIG. 3, in a stowed positioned in and on our inventive stowage system.

In FIG. 4 is shown the ramp toe 25 in a stowed condition in and on our invention 30. The ramp toe has a first side edge 25A, a second side edge 25B, a first end edge 25C, a second end edge 25D, and a top surface 25E. Also shown are the conventional directional designations of the aircraft, with appropriate arrows.

Figure 5:
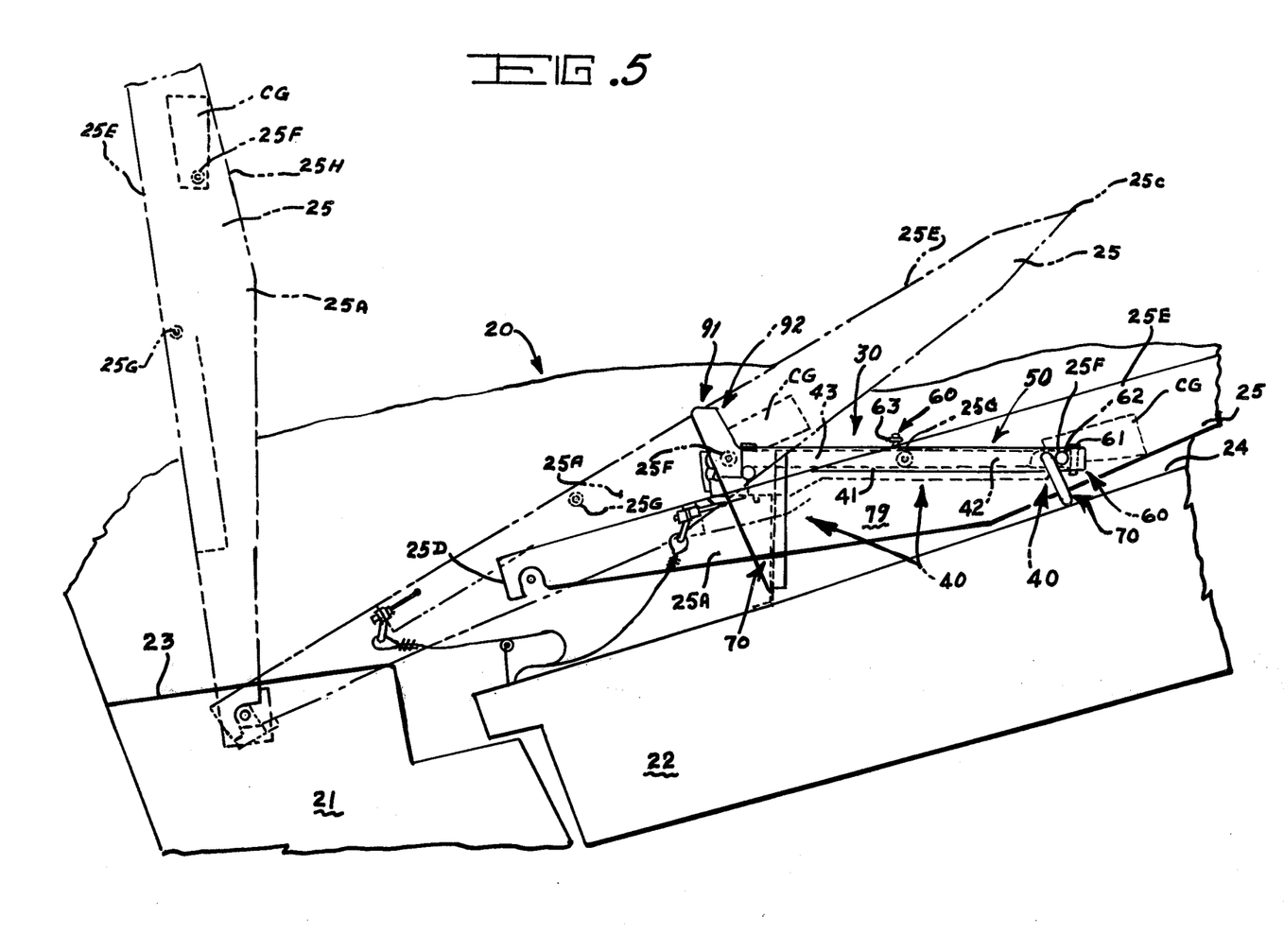
FIG. 5 is a side elevation view, in simplified form, of the tail ramp toe in the process of being stowed, and of the positional relationship of a preferred embodiment of our ramp toe stowage system to the tail ramp and to the tail door.

With reference to FIG. 5, therein is shown, in a side elevation view, the ramp toe 25 in various positions in the process of being stowed in and on our invention 30, within the aircraft 20. Also shown are: tail ramp 21 with internal surface 23; tail door 22 with internal surface 24; the center of gravity of ramp toe 25 symbolically shown and designated CG; representative slidable and rotatable guide rollers 25F and 25G connected to first side edge 25A; first end edge 25C; and, second end edge 25D.

Figure 6:
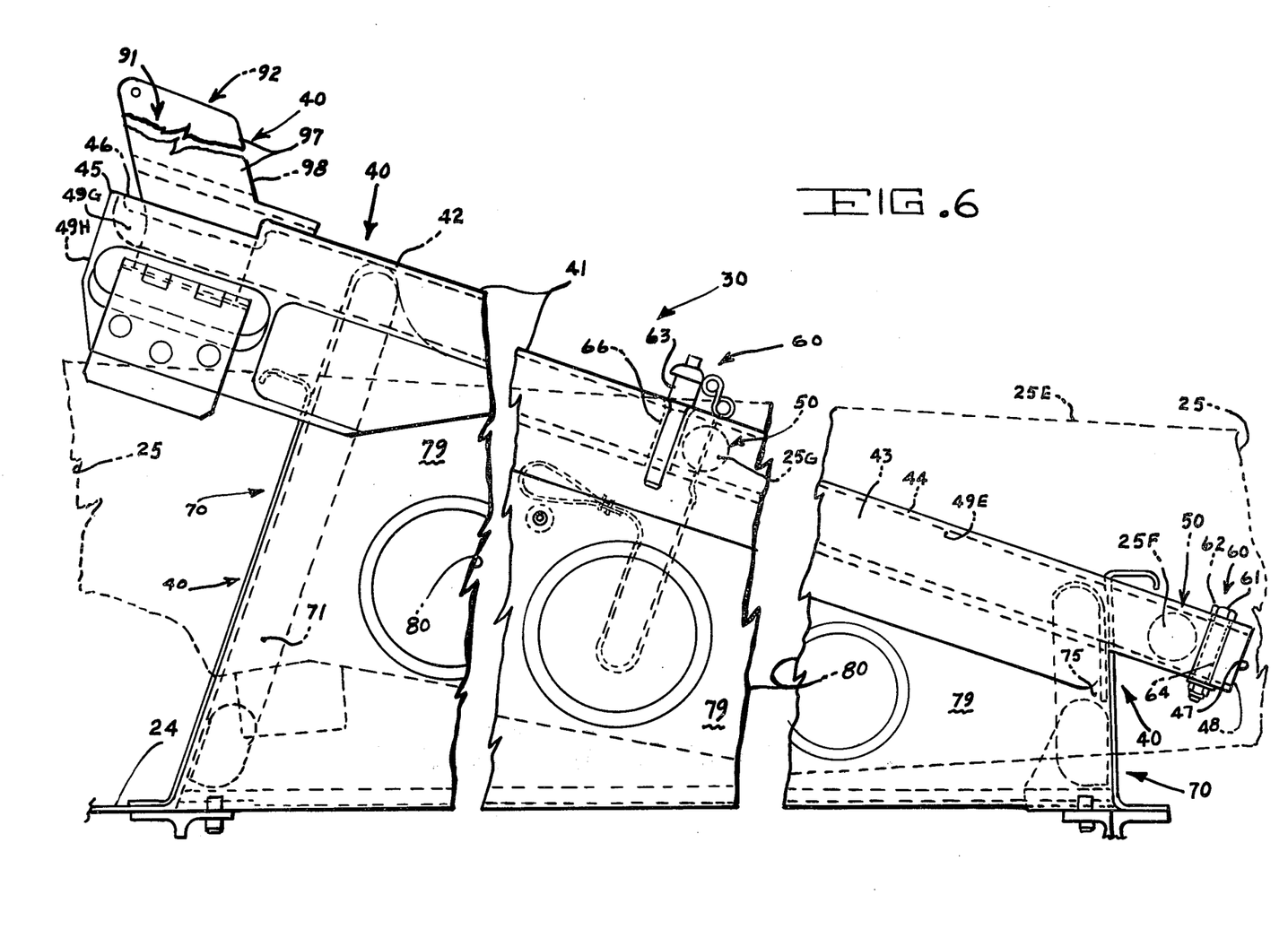
FIG. 6 is a side elevation view of the preferred embodiment of our invention in greater detail than was shown in FIGS. 4 and 5.
Figure 7A:
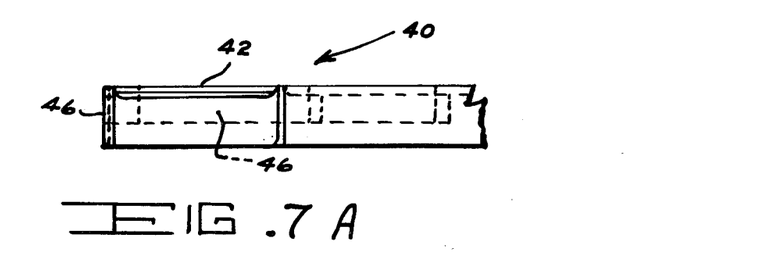
FIGS. 7A, 7B and &C are various views, in simplified form, of one representative track member constituent of our invention.
Figure 7B:
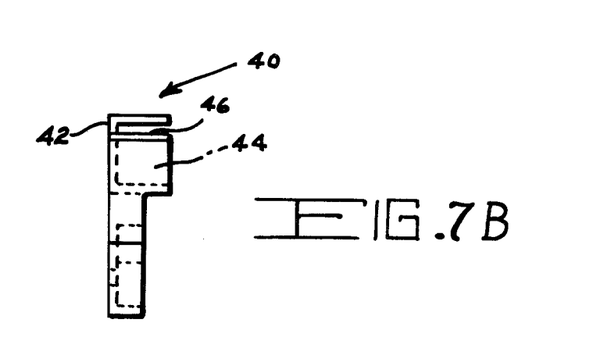
Figure 7C:
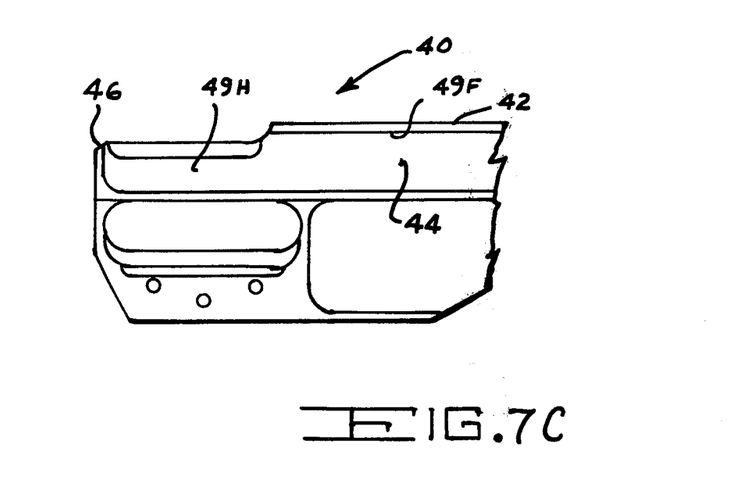

In FIG. 6 is shown a side elevation view, partially fragmented, of the preferred embodiment 30 of our invention; whereas, in FIGS. 7-12, inclusive, constituent components of the invention 30 are shown. Accordingly, principally with reference to FIGS. 6-12, inclusive, it is to be noted that the invention 30 comprises, in its most basic and generic form: means (generally designated 40, FIGS. 6-12, inclusive) for capturing and for supporting the tail ramp toe, FIGS. 2-5, inclusive, with this capturing and supporting means 40 located over and attached to the internal surface 24 of the tail door 25, FIGS. 2, 5, 6, 8-11; means (generally designated 50, FIGS, 2, 4, 5, 6, 8-12) for slidably engaging the ramp toe 25 with and to the capturing and supporting means 40, with this engaging means 50 operatively associated with the capturing and supporting means 40; and, means (generally designated 60, FIGS. 5 and 6) for releasably securing the ramp toe 25 to the capturing and supporting means 40 in a, and at a, preselected position, with this securing means 60 in operative association with the capturing and supporting means 40 and with the ramp toe 25.

The capturing and supporting means 40 includes a first track member 41, FIGS. 4, 5, 6, 8, 10 and 12, and a second track member 42, FIGS. 4, 5, 6, 7A, 7B, 7C, 9 and 11, in parallel, and in equal spaced-apart relationship to each other, FIG. 4, with each track member 41 and 42 in a horizontal position, and having a groove therein (such as groove 43 in track member 41, FIGS. 4, 6, 8, 10 and 12; and, such as groove 44 in track member 42, FIGS. 4, 6, 7A, 7B, 7C, 9 and 11), and with the track members 41 and 42 disposed such that the groove 43 in the first track member 41 and the groove 44 in the second track member 42 are mutually opposed (i.e., face each other), FIG. 4, and each track member 41 and 42 has a first end (45 for member 41, FIGS. 4 and 6; and, 46 for member 42, FIGS. 4, 6, 7A, 7B and 7C), a second end (47 for member 41, FIGS. 4 and 6; and, 48 for member 42, FIGS. 4 and 6), an inner surface (49A for member 41, FIG. 4; and 49B for member 42, FIG. 4), and an outer surface (49C for member 41, FIG. 4; and 49D for member 42, FIG. 4), and with each groove 43 and 44 having an upper surface (49E for member 41, FIG. 6; and 49F for member 42, FIG. 7C), with a recess (49G for member 41, FIGS. 4 and 10; and, 49H for member 42, FIGS. 4 and 10) therein at the first end 45 and 46 of its respective track member 41 and 42, with each recess 49G and 49H in communication with its respective groove (i.e., recess 49G with groove 43, and recess 49H with groove 44).

Figures 8, 12:
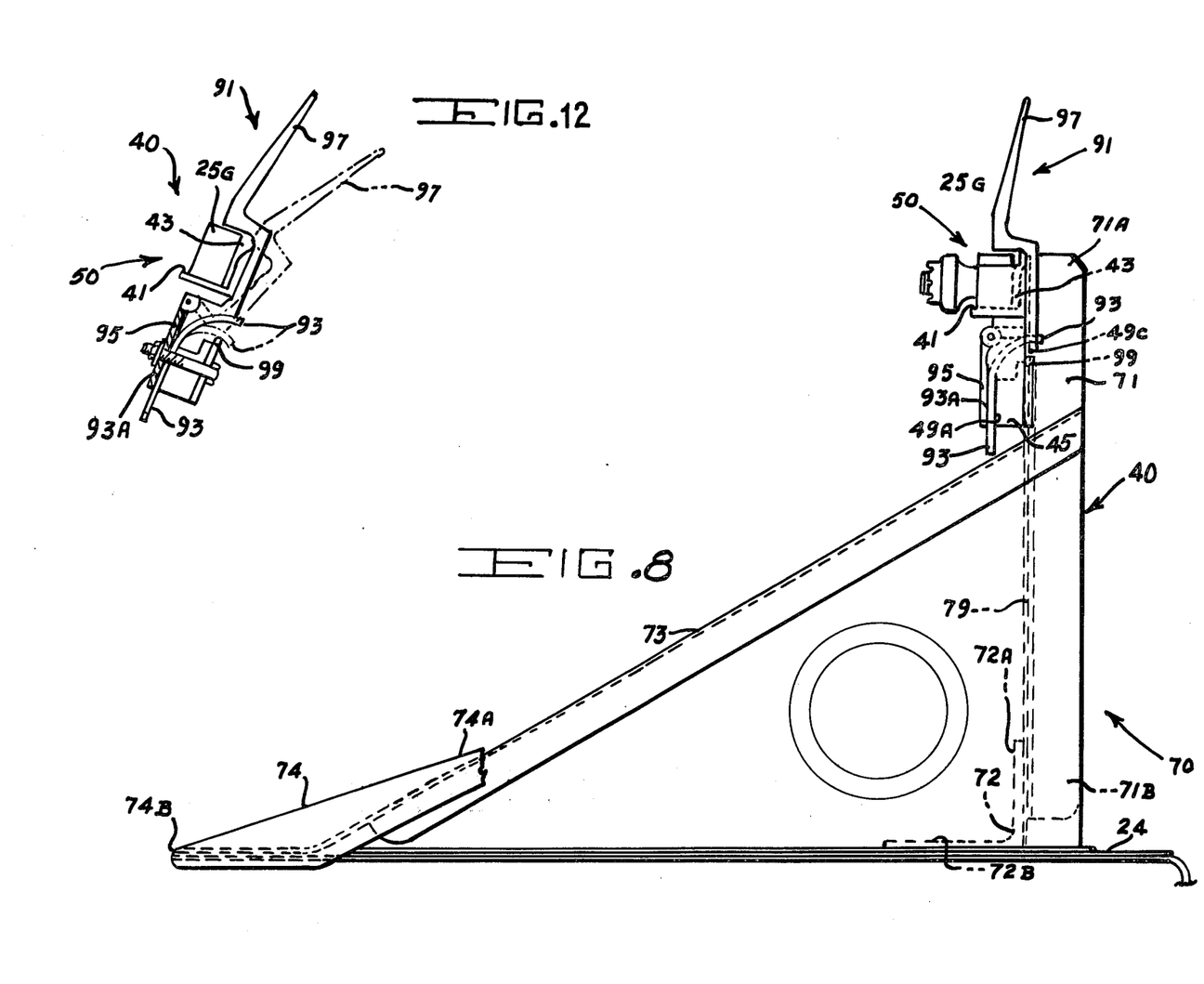
FIG. 8 is a front view, in simplified schematic form, of the forward port portion of our invention.
FIG. 12 is a front view, in simplified form, of a representative biased latching means constituent of our invention.
Figure 9:
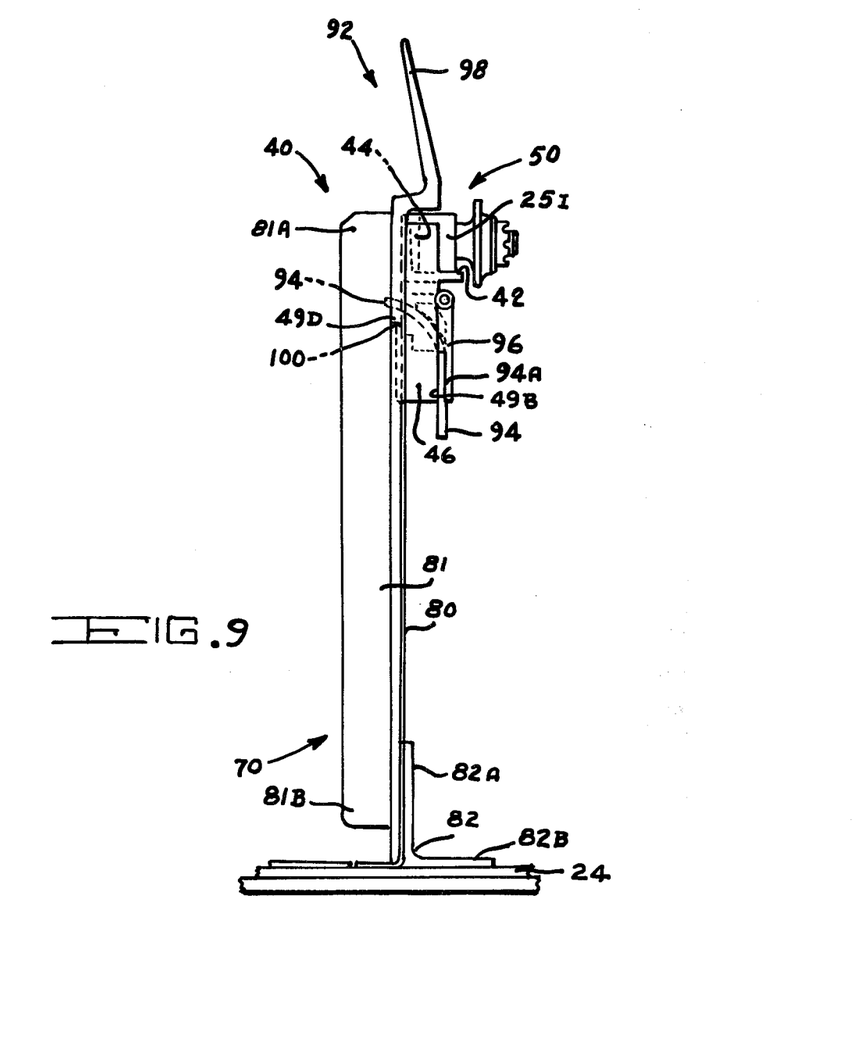
FIG. 9 is a front view, in simplified schematic form, of the forward starboard portion of our invention.

The capturing and supporting means 40 also includes: means (generally designated 70, FIGS. 4-6 and 8-11) for holding the track members 41 and 42 over, and for connecting the track members to, the internal surface 24 of the tail door 23; a first biased latching means 91, FIGS. 5, 6, 8 and 12, connected to the first end 45 of the first track member 41; and, a second biased latching means 92, FIGS. 5, 6 and 9, connected to the first end 46 of the second track member 12.

Figure 10:
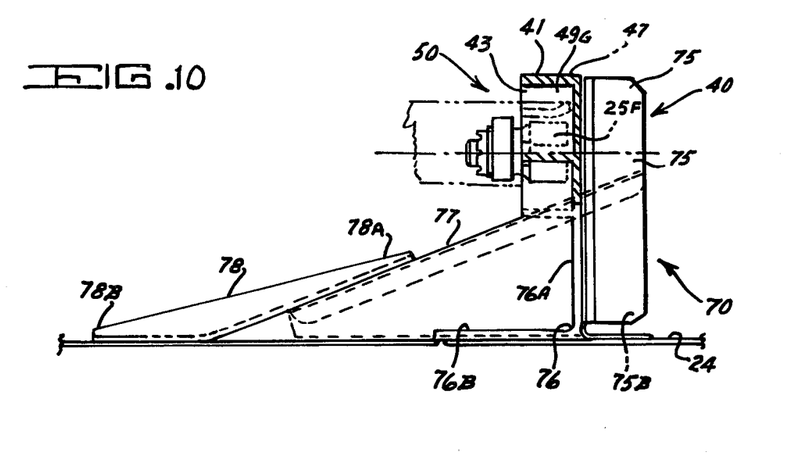
FIG. 10 is a front view, in simplified schematic form, of the rearward port portion of our invention.
Figure 11:
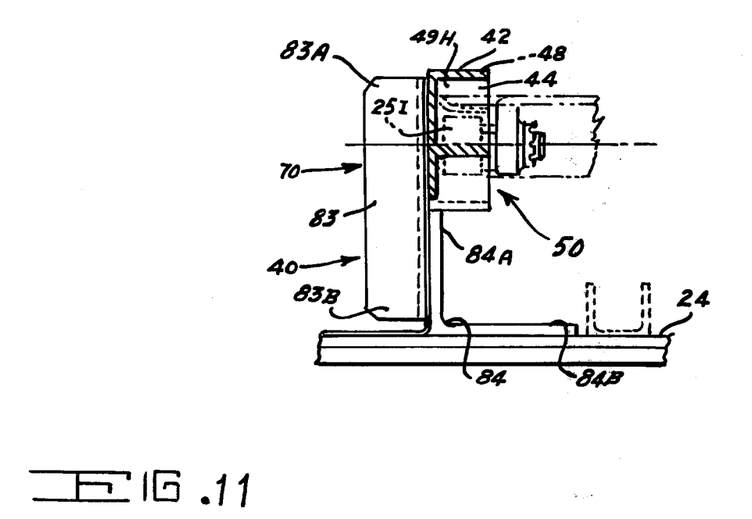
FIG. 11 is a front view, in simplified schematic form, of the rearward starboard portion of our invention.

The track members-to-ramp door holding and connecting means 70 includes: a first holding and connecting member 71, FIG. 8, having a first end 71A and second end 71B, with the first end 71A connected to the first end 45 of the first track member 41; a first angle member 72, FIG. 8, having a first leg 72A and a second leg 72B, with the first leg 72A connected to the second end 72B of the first holding and connecting member 71, and with the second leg 72B connected to the internal surface 24 of the tail door 23; a first cross member 73, FIG. 8, connected to the first holding and connecting member 71 and inclined toward the internal surface 24 of the tail door 23; a first splice angle member 74, FIG. 8, having a first leg 74A and a second leg 74B, with the first leg 74A connected to the first cross member 73, and with the second leg 74B abutting, and connected to, the internal surface 24 of the tail door 23; a third holding and connecting member 75, FIG. 10, having a first end 75A and a second end 75B, with the first end 75A connected to the second end 47 of the first track member 41; a third angle member 76, FIG. 10, having a first leg 76A and a second leg 76B, with the first leg 76A connected to the second end 75B of the third holding and connecting member 75, and with the second leg 76B connected to the internal surface 24 of the tail door 23; a second cross member 77, FIG. 10, connected to the third holding and connecting member 75, and inclined toward the internal surface 24 of the tail door 23; a second splice angle member 78, FIG. 10, having a first leg 78A and a second leg 78B, with the first leg 78A connected to the second cross member 77, and with the second leg 78B abutting, and connected to, the internal surface 24 of the tail door 23; a first web member 79, FIGS. 5, 6 and 8, connected to the first 71 and third 75 holding and connecting members, and abutting the internal surface 24 of the tail door 23; a second holding and connecting member 81, FIG. 9, having a first end 81A and a second end 81B, with the first end 81A connected to the first end 46 of the second track member 42; a second angle member 82, FIG. 9, having a first leg 82A and a second leg 82B, with the first leg 82A connected to the second end 81B of the second holding and connecting member 81, and with the second leg 82B connected to the internal surface 24 of the tail door 23; a fourth holding and connecting member 83, FIG. 11, having a first end 83A and a second end 83B, with the first end 83A connected to the second end 48 of the second track member 42; a fourth angle member 84 having a first leg 84A and a second leg 84B, with the first leg 84A connected to the second end 83B of the fourth holding and connecting member 83, and with the second leg 84B connected to the internal surface 24 of the tail door 23; and, a second web member 80, FIGS. 5 and 9, connected to the second 81 and the fourth 83 holding and supporting members, and abutting the internal surface 24 of the tail door 23.

The first 91 and the second 92 biased latching means, FIGS. 5, 6, 8, 9 and 12, which are constituents of the ramp toe capturing and supporting means 40, FIGS. 2, 5, 6 and 8–12, each includes: a spring member (93, FIGS. 8 and 12, for means 91; and, 94, FIG. 9, for means 92) attached to the inner surface of its respective track member (i.e., inner surface 49A of track member 41 for spring member 93; and inner surface 49B of track member 42 for spring member 94), with the respective spring member overhanging the outer surface of its respective track member (i.e., outer surface 49C of track member 41; and, outer surface 49D of track member 42), as shown respectively in FIGS. 8 and 9, and with the spring member having an outer surface (93A for spring member 93, and 94A for spring member 94); a hinge member (95, FIGS. 8 and 12, for means 91; and, 96, FIG. 9, for means 92) attached to the outer surface of its respective spring member (i.e., outer surface 93A of spring member 93 for hinge member 95; and outer surface 94A of spring member 94 for hinge member 96); a latch member (97, FIGS. 8 and 12, for means 91; and, 98, FIG. 9, for means 92) pivotally mounted ot its respective hinge member (i.e., 97 to hinge member 95; and, 98 to hinge member 96), and in abutting contact with its respective spring member (i.e., 97 abuts spring member 93 at the overhang; and 98 abuts spring member 94 at the overhang); and, a hinge stop member (99, FIGS. 8 and 12, for means 91; and, 100, FIG. 9, for means 92) attached to the outer surface of its respective track member (i.e., outer surface 49C of track member 41; and, outer surface 49D of track member 42), with each inge stop member 99 and 10 disposed below its respective overhanging spring member (i.e., hinge stop member 99 and spring member 93; and, hinge stop member 100 and spring member 94).

The mean 50 for slidably engaging the ramp toe 25 includes: a first plurality of slidable and rotatable guide rollers, preferably a pair (i.e., two), such as 25F and 25G, FIGS. 2, 4, 5, 6, 8, 10, 12, connected to the first side edge 25A of the ramp toe 25, FIGS. 4 and 5, with each of these rollers 25F and 25G dimensioned to fit into the recess 49G of first track member 41, FIGS. 4, 6 and 10, and to slide and to rotate into and along the groove 43 in the first track member 41, FIGS. 4, 5, 6, 8, 10 and 12; and, a second plurality of slidable and rotatable guide rollers, preferably also a pair (i.e., two), such as 25H and 25I, FIGS. 4, 9 and 11, connected to the second side edge 25B of the ramp toe 25, FIG. 4, with each of these rollers 25H and 25I dimensioned to fit into the recess 49H of second track member 42, FIGS. 4, 6, 7C and 11, and to slide and to rotate into and along the groove 44 in the second track member 42, FIGS. 4, 6, 7A, 7B, 7C, 9 and 11. It is here to be noted that one guide roller from each of the pluralities, such as guide roller 25F from the first plurality and guide roller 25H from the second plurality, is located adjacent to the known center of gravity CG of the ramp toe 25, as is shown in FIG. 5.

The means 60 for releasably securing the ramp toe 25 to the capturing and supporting means 40 includes: a first ramp toe guide roller stop, such as 61, FIGS. 4, 5 and 6, located at the second end 47 of the first track member 41; a second ramp toe guide roller stop, such as 62, FIGS. 4, 5 and 6, located at the second end 48 of the second track member 42; and, a third ramp toe guide roller stop, such as 63, FIGS. 4, 5 and 6, located intermediate of the first and second ends 45 and 47 of the first track member 41. It is here to be noted, as a matter of preference rather than of limitation, that the first ramp toe guide roller stop 61 includes a first passageway 64, FIG. 4, in and through the first track member 41 at the second end 47 of that track member 41, a first bolt removably inserted into and through the first passageway 64, and a first nut complementary to and connected to the first bolt; that the second ramp toe guide roller stop 62 includes a second passageway 65, FIG. 4, in and through the second track member 42 at the second end 48 of that track member 42, a second bolt removably inserted into and through the second passageway 65, and a second nut complementary to and connected to the second bolt; and, the third ramp toe guide roller stop includes a third passageway 66, FIG. 4, in and through the first track member 41 intermediate of the first and second ends 45 and 47 of the first track member 42, and a quick release pin 63 removably inserted into the third passageway 66.

MANNER OF OPERATION AND USE OF THE PREFERRED EMBODIMENT

The manner of operation and of use of the preferred embodiment 30 of our invention can be very easily ascertained by any person of ordinary skill in the art from the foregoing description, coupled with reference to Figures of the drawings.

For others, it is sufficient to say that, when it is desired to stow the ramp toe 25 in and on our invention 30, the ramp toe 25 is rotated down, FIGS. 2 and 5, by use of suitable means, such as by use of means 26, FIG. 2 (which said means, and associated components and the like, are disclosed in the previously mentioned U.S. Patent application Ser. No. 643,503, entitled "Ramp With Integral Toes"), until guide roller 25F, FIGS. 2, 4 and 5, and guide roller 25H, FIG. 4, on ramp toe 25 engage, respectively, horizontal track member 41, FIGS. 2, 4, 5 and 6, and horizontal track member 42, FIGS. 4–6, inclusive. More specifically, initial engagement of the guide rollers 25F and 25H with, respectively, track member 41 and track member 42 includes: fitting into, respectively, recesses 49G and 49H, FIGS. 2 and 7C; capture, respectively, by latches 97 and 98, FIGS. 6, 8, 9 and 12; and, sliding into (and/or rotating along), respectively, grooves 43 and 44, FIGS. 5, 6 and 7C. At this point, the ramp toe 25 is disconnected from the tail ramp 21. Next, the ramp toe 25 is pushed horizontally forward (i.e., aft in the aircraft) until ramp toe guide rollers 25G and 25I fit into, respectively, recesses 49G and 49H; are captured by latches 97 and 98; and slide into and rotate along, respectively, groove 43 of track member 41 and groove 44 of track member 42; and, the forward movement of guide rollers 25F and 25H is stopped, respectively, by stops 61 and 63, FIGS. 4 and 6. Then, pin 63, FIGS. 5 and 6, is removably inserted into and through passageway 66, FIG. 6, in track member 42, thereby preventing the backward (i.e., forward direction in the aircraft) of guide roller 25G, FIG. 6, and of the ramp toe 25, as well. Of course, the backward escape of all of the guide rollers 25F, 25G, 25H and 25I is prevented by latches 97 and 98.

As a result of all of these steps, the ramp toe 25 is stowed and is releasably (and safely) secured in a, and at a, preselected position in, on and by our invention 30, FIG. 2 (Position D), and FIG. 5. It is here to be noted that, to significantly reduce the handling forces which are required to rotate and to move the ramp toe 25, the guide rollers 25F and 25H are adjacent to, and close to, the known center of gravity CG of the ramp toe 25, FIG. 5, and the track members 41 and 42 (and, of course, their corresponding grooves 43 and 44) are positioned horizontally.

To release and/or to re-install the ramp toe 25 to the tail ramp 21, the above-described procedure is reversed.

CONCLUSION

It is abundantly clear from all of the foregoing, and from the Figures of the drawings, that the stated principal object, as well as other related objects, of our invention have been achieved.

It is to be noted that, although there have been described the fundamental and unique features of our invention as applied to a preferred embodiment, various other embodiments, variations, adaptations, substitutions, additions, omissions, and the like may occur to, and can be made by, those of ordinary skill in the art, without departing from the spirit of our invention.

What is claimed is:

1. A ramp toe storage system, adapted for use with a cargo aircraft having a tail, a downwardly and outwardly opening tail ramp having at least one ramp toe removably attached to said tail ramp, and an upwardly and inwardly opening tail door complementary to and aft of said tail ramp and having an internal surface, wherein said tail ramp and said tail door can be opened and closed while said aircraft is airborne and also when said aircraft is on the ground, and wherein said ramp toe has a first side edge, a second side edge, a first end edge, a second end edge, and a known center of gravity, comprising:
   a. means for capturing and supporting said ramp toe, with said capturing and supporting means located over, and attached to, said internal surface of said internal surface of said tail door wherein said ramp toe capturing and supporting means includes:
      (1) first track member and a second track member in parallel and equal spaced-apart relationship to each other, with each said track member in a horizontal position and having a groove therein, and with said track members disposed such that said groove in said first track member and said groove in said second track member are mutually opposed, and wherein each track member has a first end, a second end, and inner surface and an outer surface, and wherein each groove has an upper surface with a recess therein at said first end of its respective track member, with each said recess in communication with its respective groove;
      (2) means for holding said track members over, and for connector said track members to, said internal surface of said tail door;
      (3) a first biased latching means connected to said first end of said first track member;
      (4) and, a second biased latching means connected to said first end of said second track member;
   b. means for slidably engaging said ramp toe with and to said capturing and supporting means, with said engaging means operatively associated with said capturing and supporting means;
   c. and, means for releasably securing said ramp toe to said capturing and supporting means in a, and at a, preselected position, with said securing means in operative association with said capturing and supporting means and with said ramp toe.

2. A ramp toe stowage system, as set forth in claim 1, wherein said means for slidably engaging said ramp toe includes:
   (a) a first plurality of slidable and rotatable guide rollers connected to said first side edge of said ramp toe, with said rollers dimensioned to fit into said recess in said first track member and to slide and to rotate into and along said groove in said first track member;
   (b) and, a second plurality of slidable and rotatable guide rollers connected to said second side edge of said ramp toe, with said rollers dimensioned to fit into said recess in said second track member and to slide and to rotate into and along said groove in said second track member.

3. A ramp toe stowage system, as set forth in claim 2, wherein said means for releasably securing said ramp toe to said capturing and supporting means includes:
   (a) a first ramp toe guide roller stop located at said second end of said first track member;
   (b) a second ramp toe guide roller stop located at said second end of said second track member;
   (c) and, a third ramp toe guide roller stop located intermediate of said first and second ends of said first track member.

4. A ramp toe stowage system, as set forth in claim 3, wherein said means for holding said tracks over, and for connecting said tracks to, said internal surface of said tail door includes:
   (a) a first holding and connecting member having a first end and a second end, with said first end connected to said first end of said first track member;
   (b) a first angle member having a first leg and a second leg, with said first leg connected to said second end of said first holding and connecting member, and with said second leg connected to said internal surface of said tail door;
   (c) a first cross member connected to said first holding and connecting member, and inclined toward said internal surface of said tail door;

(d) a first splice angle member having a first leg and a second leg, with said first leg connected to said first cross member, and with said second leg abutting, and connected to, said internal surface of said tail door;

(e) a third holding and connecting member having a first end and a second end, with said first end connected to said second end of said first track member;

(f) a third angle member having a first and a second leg with said first leg connected to said second end of said third holding and connecting member, and with said second leg connected to said internal surface of said tail door;

(g) a second cross member connected to said third holding and connecting member, and inclined toward said internal surface of said tail door;

(h) a second splice angle member having a first leg and a second leg, with said first leg connected to said second cross member, and with said second leg abutting, and connected to, said internal surface of said tail door;

(i) a first web member connected to said first and said third holding and connecting members, and abutting said internal surface of said tail door;

(j) a second holding and connecting member having a first end and a second end, with said first end connected to said first end of said second track member;

(k) a second angle member having a first leg and a second leg, with said first leg connected to said second end of said second holding and connecting member, and with said second leg connected to said internal surface of said tail door;

(l) a fourth holding and connecting member having a first and a second end, with said first end connected to said second end of said second track member;

(m) a fourth angle member having a first leg and a second leg, with said first leg connected to said second end of said fourth holding and connecting member, and with said second leg connected to said internal surface of said tail door;

(n) and, a second web member connected to said second and said fourth holding and connecting members, and abutting said internal surface of said tail door.

5. A ramp toe stowage system, as set forth in claim 4, wherein said first and said second biased latching means each includes:

(a) a spring member attached to said inner surface of its respective track member and overhanging said outer surface of said track member, with said spring member having an outer surface;

(b) a hinge member attached to said outer surface of said spring member;

(c) a latch member pivotally mounted to said hinge member, and in abutting contact with said spring member;

(d) and, a hinge stop member attached to said outer surface of said track member, and disposed below said overhanging spring member.

6. A ramp toe stowage system, as set forth in claim 5, wherein said first and second pluralities of slidable and rotatable ramp toe guide rollers each comprise a pair of guide rollers, with one guide roller of each said pair adjacent said known center of gravity of said ramp toe.

7. A ramp toe stowage system, as set forth in claim 6, wherein:

(a) said first ramp toe guide roller stop includes a first passageway in and through said first track member at said second end thereof, a first bolt removably inserted into and through said first passageway, and a first nut complementary to and connected to said first bolt;

(b) said second ramp toe guide roller stop includes a second passageway in and through said second track member at said second end thereof, a second bolt removably inserted into and through said second passageway, and a second nut complementary to and connected to said second bolt;

(c) and, said third ramp toe guide roller stop includes a third passageway in and through said first track member intermediate said first and second ends of said first track member, and a pin removably inserted into said third passageway.

* * * * *